(12) United States Patent
Park et al.

(10) Patent No.: US 10,712,933 B2
(45) Date of Patent: Jul. 14, 2020

(54) TERMINAL AND METHOD FOR CONTROLLING TERMINAL

(71) Applicant: Samsung Electronics Co., Ltd., Gyeonggi-do (KR)

(72) Inventors: Sung-wook Park, Gyeonggi-do (KR); Se-hwan Park, Gyeonggi-do (KR); Jae-yong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 399 days.

(21) Appl. No.: 15/158,284

(22) Filed: May 18, 2016

(65) Prior Publication Data

US 2016/0266788 A1    Sep. 15, 2016

Related U.S. Application Data

(63) Continuation of application No. PCT/KR2014/011049, filed on Nov. 18, 2014.

(30) Foreign Application Priority Data

Nov. 18, 2013 (KR) .................. 10-2013-0140090

(51) Int. Cl.
*G06F 3/0488* (2013.01)
*G06F 3/0482* (2013.01)
(Continued)

(52) U.S. Cl.
CPC ........ *G06F 3/04883* (2013.01); *G06F 3/0482* (2013.01); *G06F 3/04817* (2013.01);
(Continued)

(58) Field of Classification Search
CPC .................................. G06F 3/04883
See application file for complete search history.

(56) References Cited

U.S. PATENT DOCUMENTS

| | | | |
|---|---|---|---|
| 9,311,000 B2 | 4/2016 | Seo | |
| 2006/0218503 A1* | 9/2006 | Matthews | G06F 3/0482 |
| | | | 715/779 |

(Continued)

FOREIGN PATENT DOCUMENTS

| | | |
|---|---|---|
| KR | 10-1160543 | 6/2012 |
| KR | 10-1169374 | 7/2012 |

(Continued)

OTHER PUBLICATIONS

PCT/ISA/210 Search Report issued on PCT/KR2014/011049 pp. 3.

(Continued)

*Primary Examiner* — Jennifer N To
*Assistant Examiner* — Ashley M Fortino
(74) *Attorney, Agent, or Firm* — The Farrell Law Firm, P.C.

(57) ABSTRACT

Provided is a terminal allowing a user to easily search for and execute an application, and a method of controlling the terminal. The method includes displaying a first output screen including a screen of an application; receiving a first gesture; displaying a second output screen including a keyboard interface, according to the received first gesture; receiving a search word via the keyboard interface; displaying a third output screen including a list of applications searched by using the received search word; receiving a second gesture; and executing at least one application from among the applications, according to the received second gesture.

14 Claims, 21 Drawing Sheets

(51) Int. Cl.
  *G06F 3/0484* (2013.01)
  *G06F 16/245* (2019.01)
  *G06F 16/248* (2019.01)
  *G06F 9/44* (2018.01)
  *G06F 9/445* (2018.01)
  *G06F 16/00* (2019.01)
  *G06F 3/0481* (2013.01)

(52) U.S. Cl.
  CPC ...... *G06F 3/04845* (2013.01); *G06F 3/04886* (2013.01); *G06F 9/44* (2013.01); *G06F 9/445* (2013.01); *G06F 16/00* (2019.01); *G06F 16/245* (2019.01); *G06F 16/248* (2019.01)

(56) References Cited

U.S. PATENT DOCUMENTS

| | | |
|---|---|---|
| 2007/0027852 A1 | 2/2007 | Howard et al. |
| 2007/0130535 A1* | 6/2007 | DeMaio .................... G06F 9/00 715/779 |
| 2009/0058821 A1 | 3/2009 | Chaudhri et al. |
| 2011/0125724 A1* | 5/2011 | Kim ........................ G06F 17/30 707/706 |
| 2012/0169593 A1* | 7/2012 | Mak ....................... G06F 3/0485 345/157 |
| 2012/0254795 A1 | 10/2012 | Van Os et al. |
| 2012/0297348 A1 | 11/2012 | Santoro |
| 2013/0120267 A1* | 5/2013 | Pasquero .............. G06F 17/276 345/168 |
| 2013/0169540 A1 | 7/2013 | Dinh |
| 2014/0165012 A1* | 6/2014 | Shen ....................... G06F 3/017 715/863 |
| 2014/0365496 A1 | 12/2014 | Chung |

FOREIGN PATENT DOCUMENTS

WO  WO 2013100480       7/2013
WO  WO-2013124470 A1 *  8/2013  .......... G06F 3/0481

OTHER PUBLICATIONS

PCT/ISA/237 Written Opinion issued on PCT/KR2014/011049 pp. 9.

International Search Report dated Feb. 10, 2015 issued in counterpart application No. PCT/KR2014/011049, 28 pages.

* cited by examiner

TERMINAL AND METHOD FOR CONTROLLING TERMINAL

PRIORITY

This application is a continuation of PCT/KR2014/011049, filed Nov. 18, 2014, and claims priority to Korean Patent Application No. 10-2013-0140090, filed in the Korean Intellectual Property Office on Nov. 18, 2013, the contents of which are incorporated herein by reference.

TECHNICAL FIELD

Embodiments relate to a terminal allowing a user to easily search for and execute an application, and a method of controlling the terminal.

BACKGROUND ART

Since communication technologies are developed and electronic devices have become smaller, personal terminals are being widely supplied to general users. Recently, personal devices such as smartphones, smart tablets, portable consoles, or the like have become widespread.

Various programs may be executed in a terminal. The program that is executed in the terminal is referred to as an application. Due to the widespread use of smartphones, various applications that are executable in the smartphones are being developed. A user of the terminal installs several tens to several hundreds of applications in the terminal and uses them.

Therefore, the user may experience difficulties in searching an application to be executed from among many applications installed in the terminal. In addition, while the user uses an application, if the user attempts to refer to information that is obtainable from another application, the user may experience difficulties in switching between the applications.

For example, it is assumed that the user attempts to refer to contents of a mail while the user types a text message. The user may type the text message by using a short message service (SMS) application. The user may make a home screen be displayed on the terminal by pressing a button of the terminal. The user may search for a mail application from among the applications installed in the terminal and may execute the mail application. The user may check the contents of the mail and then may allow a screen of the SMS application to be displayed again on the terminal.

DETAILED DESCRIPTION OF THE INVENTION

Technical Problem

There is a demand for a method and apparatus for allowing a user of a terminal to easily search for and execute an application. There is also a demand for a method and apparatus for allowing a user of a terminal to easily switch from a screen of one application to a screen of another application to be displayed on the terminal.

Technical Solution

According to an aspect of the present disclosure, there is provided a method of controlling a terminal, the method including displaying a first output screen including a screen of an application; receiving a first gesture; displaying a second output screen including a keyboard interface, according to the received first gesture; receiving a search word via the keyboard interface; displaying a third output screen including a list of applications searched by using the received search word; receiving a second gesture; and executing at least one application from among the searched applications, according to the received second gesture.

Advantageous Effects

According to embodiments, there may be provided a terminal and a method of controlling the terminal that allows a user to easily search for and execute an application.

In addition, there may be provided a terminal and a method of controlling the terminal that allows a user to easily switch from a screen of one application to a screen of another application to be displayed on the terminal.

BEST MODE

Figure 1:
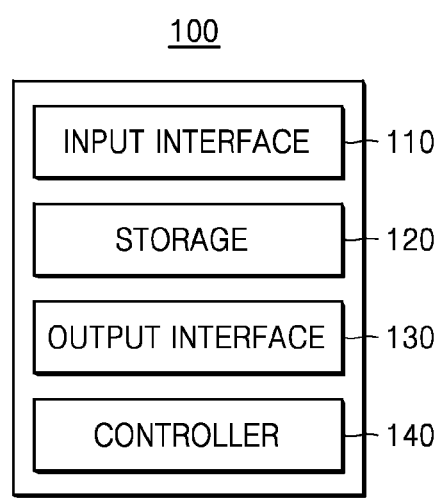
FIG. 1 is a block diagram illustrating a configuration of a terminal, according to an embodiment.

According to an aspect of the present disclosure, there is provided a method of controlling a terminal, the method including displaying a first output screen including a screen of an application; receiving a first gesture; displaying a second output screen including a keyboard interface, according to the received first gesture; receiving a search word via the keyboard interface; displaying a third output screen including a list of applications searched by using the received search word; receiving a second gesture; and executing at least one application from among the searched applications, according to the received second gesture.

The first output screen may further include a docked launcher icon, and the receiving of the first gesture may include receiving drag starting from the launcher icon.

The first output screen may further include a floating launcher icon, and the receiving of the first gesture may include receiving a tap with respect to the launcher icon.

The displaying of the third output screen may include searching for, from among stored applications, an application including the search word in names of the stored applications; generating the third output screen including a list of applications; and displaying the third output screen.

The displaying of the third output screen may include arranging the searched applications included in the list, based on a number of times the applications were executed; generating the third output screen including a list of the arranged applications; and displaying the third output screen.

The displaying of the third output screen may include searching for, from among stored applications, an application including the search word in an initial sound list of names of the stored applications; generating the third output screen including a list of applications; and displaying the third output screen.

The displaying of the third output screen may include searching for, from among stored applications, an application including the search word in tags corresponding to the stored applications; generating the third output screen including a list of applications; and displaying the third output screen.

The receiving of the second gesture may include receiving a tap with respect to a particular application from among the searched applications included in the list of the applications, and the executing of the at least one application may include executing the particular application.

The method may further include displaying a fourth output screen including a screen of the executed at least one application.

According to another aspect of the present disclosure, there is provided a method of controlling a terminal, the method including displaying a first output screen including a screen of an application; receiving a first gesture; displaying a second output screen including a keyboard interface, according to the received first gesture; receiving a search word via the keyboard interface; and when an application corresponding to the received search word is not stored, displaying a third output screen including a search result, obtained using an external search engine, with respect to the search word.

The displaying of the third output screen may include searching for an application corresponding to the search word from among stored applications; when the application corresponding to the search word is not stored, displaying a fourth output screen including a guide sentence for checking whether or not to perform searching with respect to the search word by using the external search engine; and displaying the third output screen.

According to another aspect of the present disclosure, there is provided a method of controlling a terminal, the method including displaying a first output screen including a screen of an application; receiving a first gesture; displaying, according to the received first gesture, a second output screen including at least one of a list of applications arranged based on execution time periods, a list of applications arranged based on a number of execution times, and a list of all stored applications; receiving a second gesture; and executing at least one application from among the applications included in the second output screen, according to the received second gesture.

The method may further include displaying a third output screen including a screen of the executed at least one application.

According to another aspect of the present disclosure, there is provided a method of controlling a terminal, the method including displaying a first output screen including a screen of an application; receiving a first gesture; displaying a second output screen including a list of applications currently being executed, according to the received first gesture; receiving a second gesture; and ending at least one application from among the list of the applications included in the second output screen, according to the received second gesture.

According to another aspect of the present disclosure, there is provided a method of controlling a terminal, the method including displaying a first output screen including a screen of an application; receiving a first gesture; displaying, according to the received first gesture, a second output screen including at least one of a list of applications arranged based on execution time periods and a list of applications arranged based on a number of execution times; receiving a second gesture; and displaying, according to the received second gesture, a third output screen including a user interface for editing the at least one list of applications included in the second output screen.

The user interface may include at least one of a user interface for excluding a particular application from the at least one list of the applications included in the second output screen, a user interface for switching from a particular application in the at least one list of the applications included in the second output screen to another application, a user interface for adding a particular application to the at least one list of the applications included in the second output screen, and a user interface for changing an order of the applications included in the at least one list included in the second output screen.

According to another aspect of the present disclosure, there is provided a method of controlling a terminal, the method including displaying a first output screen including a screen of an application; receiving a first gesture; displaying a second output screen including a keyboard interface, according to the received first gesture; receiving a second gesture; displaying a third output screen including a list of applications mapped to a key of the keyboard interface, according to the received second gesture; receiving a third gesture; and executing at least one application from among the applications included in the third output screen, according to the received third gesture.

A list of applications respectively mapped to keys of the keyboard interface may include applications from among all stored applications, wherein first syllables of names of the applications correspond to the keys, respectively.

The method may further include displaying a fourth output screen including a screen of the executed at least one application.

The third output screen may further include an icon disposed above the key, and the icon may correspond to an application that is preset as a default in the list of the applications mapped to the key.

According to another aspect of the present disclosure, there is provided a method of controlling a terminal, the method including displaying a first output screen including a screen of an application; receiving a first gesture; displaying a second output screen including a keyboard interface, according to the received first gesture; receiving a second gesture; displaying a third output screen including a list of applications mapped to a key of the keyboard interface, according to the received second gesture; receiving a third gesture; and displaying, according to the received third gesture, a fourth output screen including a user interface for editing the list of the mapped applications.

The user interface may include at least one of a user interface for excluding a particular application from the list of the mapped applications, a user interface for switching from a particular application in the list of the mapped applications to another application, a user interface for adding a particular application to the list of the mapped applications, and a user interface for changing an order of the applications included in the list of the mapped applications.

According to another aspect of the present disclosure, there is provided a terminal including an input interface configured to receive an input; a storage configured to store one or more applications; a controller configured to execute the one or more applications and to generate an output screen, according to the received input; and an output interface configured to display the output screen, wherein the controller is further configured to generate a first output screen including a screen of an application from among the one or more applications, the output interface is further configured to display the first output screen, the input interface is further configured to receive a first gesture, the controller is further configured to generate a second output screen including a keyboard interface according to the received first gesture, the output interface is further configured to display the second output screen, the input interface is further configured to receive a search word via the keyboard interface, the controller is further configured to generate a third output screen including a list of at least one application corresponding to the received search word from among the one or more applications stored in the storage, the output interface is further configured to display the third output screen, the input interface is further configured to receive a second gesture, and the controller is further configured to execute at least one of the at least one application included in the list, according to the received second gesture.

The controller may be further configured to generate a fourth output screen including a screen of the executed at least one application, and the output interface may be further configured to display the fourth output screen.

Mode of the Invention

Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to one of ordinary skill in the art, and the present disclosure will only be defined by the appended claims. Like reference numerals refer to like elements throughout the specification.

While terms "first", "second", and the like are used to describe various components, it is obvious that the components are not limited to the terms "first" and "second". The terms "first" and "second" are used only to distinguish between each component. Therefore, hereinafter, a first component may indicate a second component in the inventive concept of the present disclosure.

Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited component or a process, not excluding the existence of one or more other recited components or one or more other processes.

Unless expressly described otherwise, all terms including descriptive or technical terms which are used herein should be construed as having meanings that are obvious to one of ordinary skill in the art. Also, terms that are defined in a general dictionary and that are used in the following description should be construed as having meanings that are equivalent to meanings used in the related description, and unless expressly described otherwise herein, the terms should not be construed as being ideal or excessively formal.

Hereinafter, with reference to FIGS. 1 through 21, a terminal 100 and a method of controlling the terminal 100 according to an embodiment will be described in detail.

FIG. 1 is a block diagram illustrating a configuration of the terminal 100, according to an embodiment. Referring to FIG. 1, the terminal 100 may include an input interface 110, a storage 120, an output interface 130, and a controller 140.

The input interface 110 may receive an input. The input interface 110 may receive an input from a user of the terminal 100. For example, the input interface 110 may be a button, a touchscreen, a trackball, a camera, a keyboard, a mouse, a fingerprint recognition device, or the like. The input interface 110 may be a touchscreen.

The input interface 110 may receive a gesture from the user. The user may input, as the gesture, a tap or drag via the touchscreen. The input interface 110 may receive a search word for searching for an application from the user.

The storage 120 may store an application. One or more applications may be installed in the storage 120. The storage 120 may be a volatile memory or a non-volatile memory. For example, the storage 120 may be a flash memory, a read-only memory (ROM), a random access memory (RAM), an electrically erasable read-only memory (EEROM), an erasable programmable read-only memory (EPROM), an electrically erasable programmable read-only memory (EEPROM), a hard disk drive (HDD), a register, or the like.

The output 130 may display an output screen. The output screen may be generated by the controller 140. The output interface 130 may display a screen of an application from among applications that are currently executed in the terminal. The output interface 130 may display a user interface. In other words, the output screen may include the screen of the application or the user interface.

The output interface 130 may include a display device. For example, the output interface 130 may be a flat panel display device such as a liquid crystal display (LCD), an organic light emitting diode (OLED), a plasma display panel (PDP), or the like. The output interface 130 may be a curved display or a flexible display. The output interface 130, the input interface 110, and the touchscreen may be integrally formed or may be separately formed.

The controller 140 may search for a particular application from among the applications stored in the storage 120, by using a search word received via the input interface 110. The controller 140 may execute an application stored in the storage 120, according to an input received via the input interface 110. In addition, the controller 140 may generate the output screen.

The controller 140 may control other elements included in the terminal 100. For example, the controller 140 may be a central processing unit (CPU).

Figure 2:
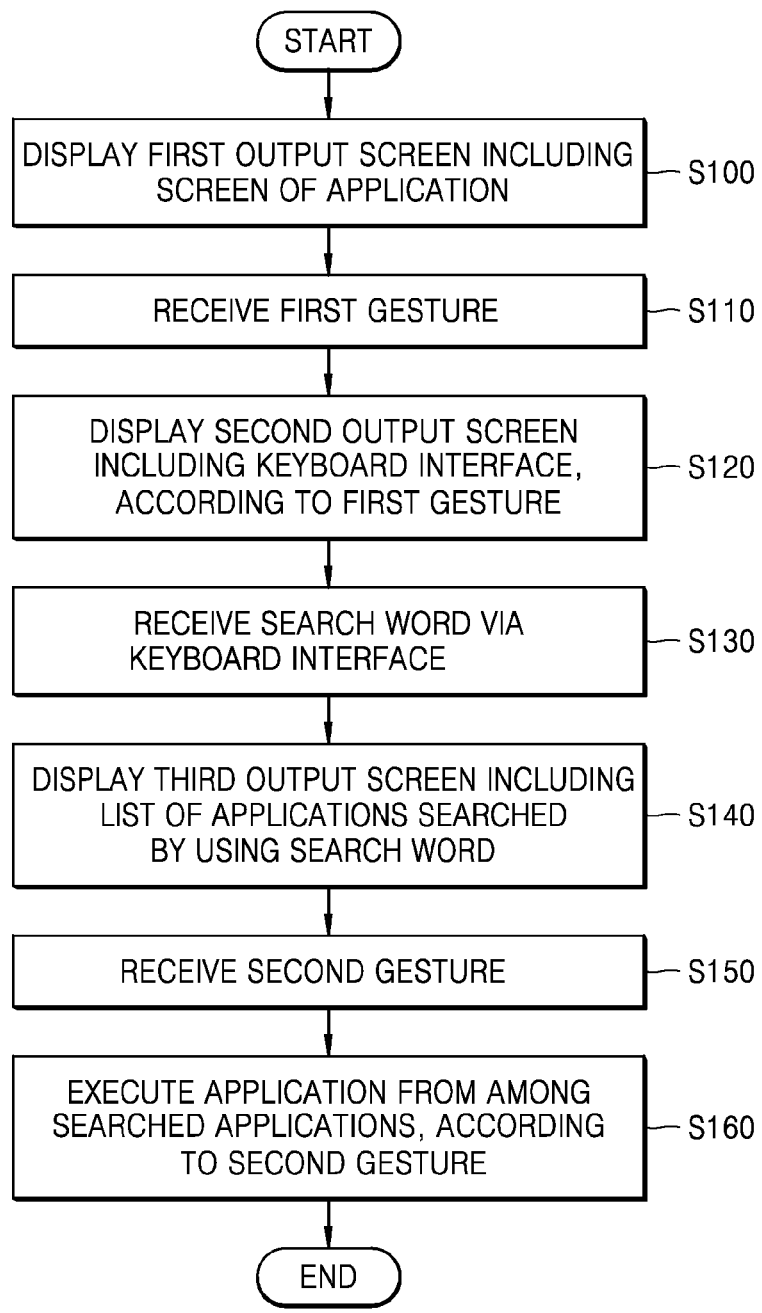
FIG. 2 is a flowchart illustrating processes of a method of controlling the terminal according to an embodiment.

Hereinafter, a method of controlling the terminal 100 according to an embodiment is described in detail. FIG. 2 is a flowchart illustrating processes of the method of controlling the terminal 100 according to the embodiment.

Referring to FIG. 2, in the method of controlling the terminal 100 according to the embodiment, an operation (S100) of displaying a first output screen including a screen of an application may be performed. The output interface 130 may display an output screen including a screen of an application. The output screen may be generated by the controller 140. For example, the application may be a home application, a short message service (SMS) application, a contact application, a web browser application, or the like. Hereinafter, a screen of the home application is referred to as a home screen.

The first output screen may include the screen of the application and a launcher icon. The first output screen may include a docked launcher icon 150. The first output screen may include a floating launcher icon 160.

Figure 3:
FIG. 3 illustrates a screen including a home screen and a docked launcher icon.
Figure 4:
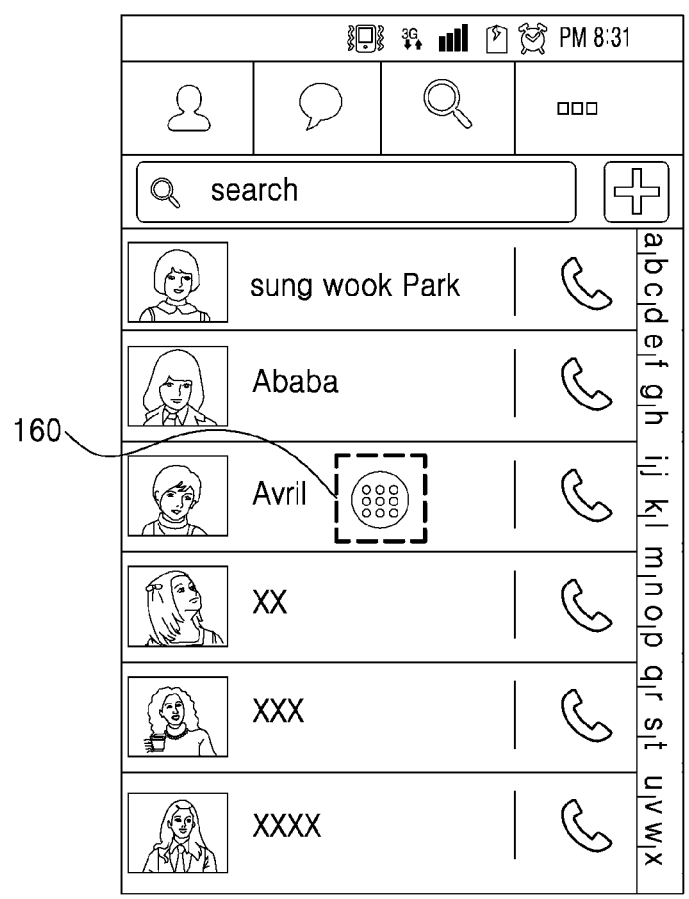
FIG. 4 illustrates a screen including a screen of a contact application and a floating launcher icon.

FIG. 3 illustrates a screen including the home screen and the docked launcher icon 150. As illustrated in FIG. 3, the launcher icon 150 may be docked on a lower center portion of the first output screen. In addition, FIG. 4 illustrates a screen including a screen of the contact application and the floating launcher icon 160. As illustrated in FIG. 4, the launcher icon 160 may be included at a center portion of the first output screen.

Referring back to FIG. 3, next, an operation (S110) of receiving a first gesture may be performed. The input interface 110 may receive a gesture from the user. For example, the gesture may include a tap, a double-tap, a multi-point tap, holding, release holding, drag, or the like.

Next, an operation (S120) of displaying a second output screen including a keyboard interface 170, according to the received first gesture, may be performed. For example, when upward drag starting from the docked launcher icon 150 is received, the controller 140 may generate the second output screen including the screen of the application and the keyboard interface 170. The output interface 130 may display the generated second output screen.

Figure 5:
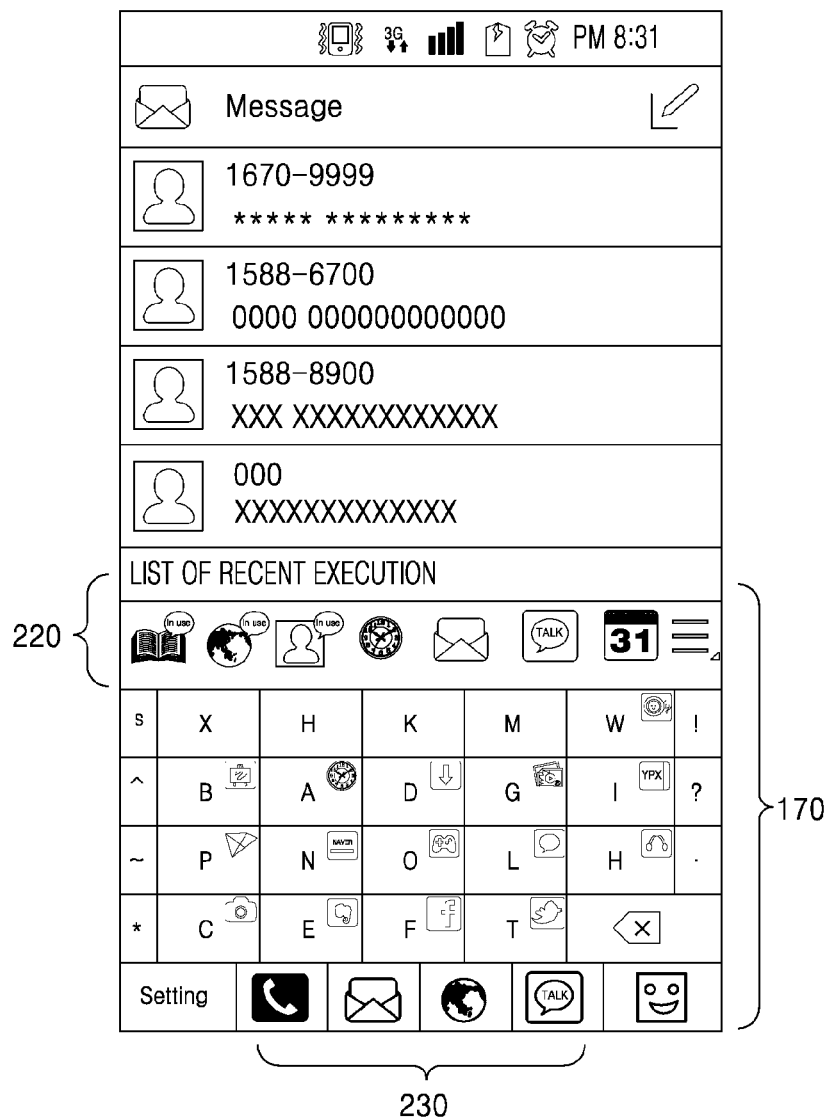
FIG. 5 illustrates a screen including a screen of a short message service (SMS) application and a keyboard interface.

According to another embodiment, when a tap with respect to the floating launcher icon 160 is received, the controller 140 may generate the second output screen including the screen of the application and the keyboard interface 170. For example, as illustrated in FIG. 5, a second output screen including a screen of the SMS application and the keyboard interface 170 may be generated and displayed.

According to another embodiment, according to the received first gesture, the floating launcher icon 160 may be displayed at a changed position. For example, when drag starting from the floating launcher icon 160 to another position different from the position of the floating launcher icon 160 is received, the floating launcher icon 160 may be displayed at a changed position.

According to another embodiment, according to the received first gesture, the docked launcher icon 150 may be switched to the floating launcher icon 160 and may be displayed. In addition, according to the received first gesture, the floating launcher icon 160 may be switched to the docked launcher icon 150 and may be displayed.

For example, when holding with respect to the docked launcher icon 150 is received, the docked launcher icon 150 may be switched to the floating launcher icon 160 and may be displayed. In addition, when drag starting from the floating launcher icon 160 to a lower center portion of an output screen is received, the floating launcher icon 160 may be switched to the docked launcher icon 150 and may be displayed.

Referring back to FIG. 2, next, an operation (S130) of receiving a search word via the keyboard interface 170 may be performed. The input interface 110 may receive the search word from the user. The user may input the search word by using the keyboard interface 170 displayed on the touchscreen.

Next, an operation (S140) of displaying a third output screen including a list of applications searched by using the received search word may be performed. For example, as illustrated in FIG. 6, an output screen including a screen of a contact application and a list 180 of applications searched by using a received search word may be generated and displayed.

The controller 140 may search for an application including the search word in a name of the application from among applications stored in the storage 120. Referring to FIG. 6, the input interface 110 may receive "Naver" as the search word from the user. The controller 140 may search for an application including "Naver" in a name of the application from among the applications stored in the storage 120. The controller 140 may generate an output screen including the list 180 of the applications.

Figure 6:
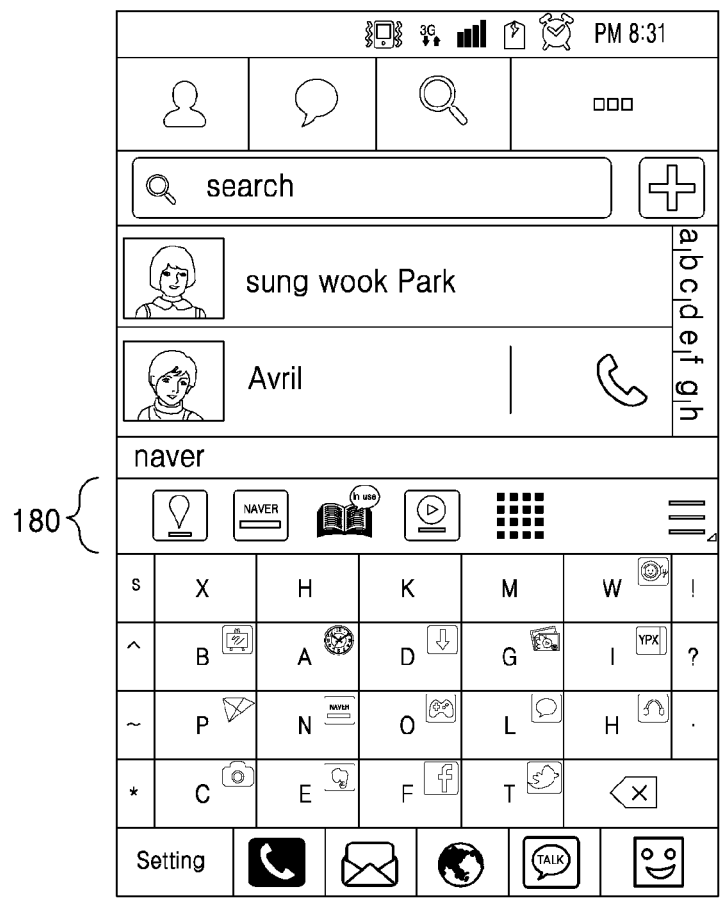
FIG. 6 illustrates a screen including a screen of a contact application and a list of applications searched by using a received search word.

For example, as illustrated in FIG. 6, four applications whose names are respectively "Naver map", "Naver", "Naver webtoon", and "Naver media player" may be searched. The output interface 130 may display the output screen including the list 180 of the applications.

The list of the applications searched by using the search word may be arranged according to the number of times each application was executed. The controller 140 may generate an output screen including a list of the arranged applications. For example, referring to FIG. 6, the application having "Naver map" as its name may be the most frequently executed application from among the four applications. Also, the application having "Naver" as its name may be the most frequently executed application from among the four applications, except for the application having "Naver map" as its name.

Figure 7:
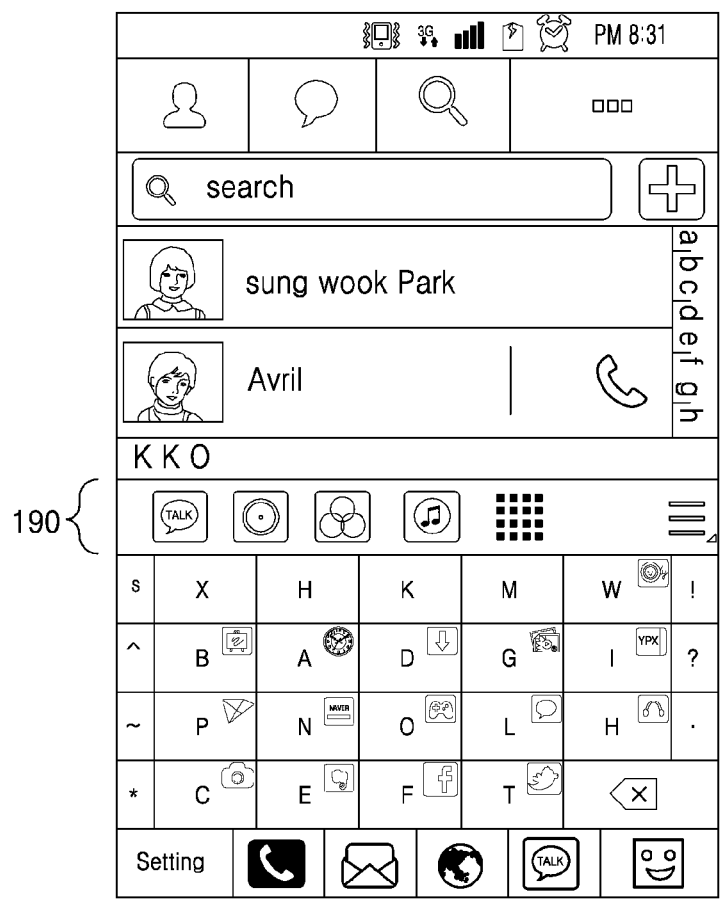
FIG. 7 illustrates a screen including a screen of the contact application and a list of applications searched by using another received search word.

According to another embodiment, the controller 140 may search for applications including a search word in an initial sound list of application names from among the applications stored in the storage 120. FIG. 7 illustrates a screen including a screen of the contact application and a list 190 of applications searched by using received another search word.

Referring to FIG. 7, the input interface 110 may receive "k k o" as a search word from the user. The controller 140 may search for applications including "k k o" in an initial sound list of application names from among the applications stored in the storage 120. For example, as illustrated in FIG. 7, four applications whose names are respectively "kakao talk", "kakao story", "kakao group", and "kakao music" may be searched. The output interface 130 may display an output screen including the list 190 of the applications.

According to another embodiment, the controller 140 may search for an application including a search word in a tag of the application from among the applications stored in the storage 120. The tag of the application may be pre-set. For example, "katalk" may be pre-set as a tag of an application having "kakao talk" as its name. In addition, "TV" may be pre-set as a tag of an application having "DMB" as its name. In addition, "calendar" may be pre-set as a tag of an application having "scheduler" as its name. In addition, "Naver player" may be pre-set as a tag of an application having "Naver media player" as its name.

Figure 8:
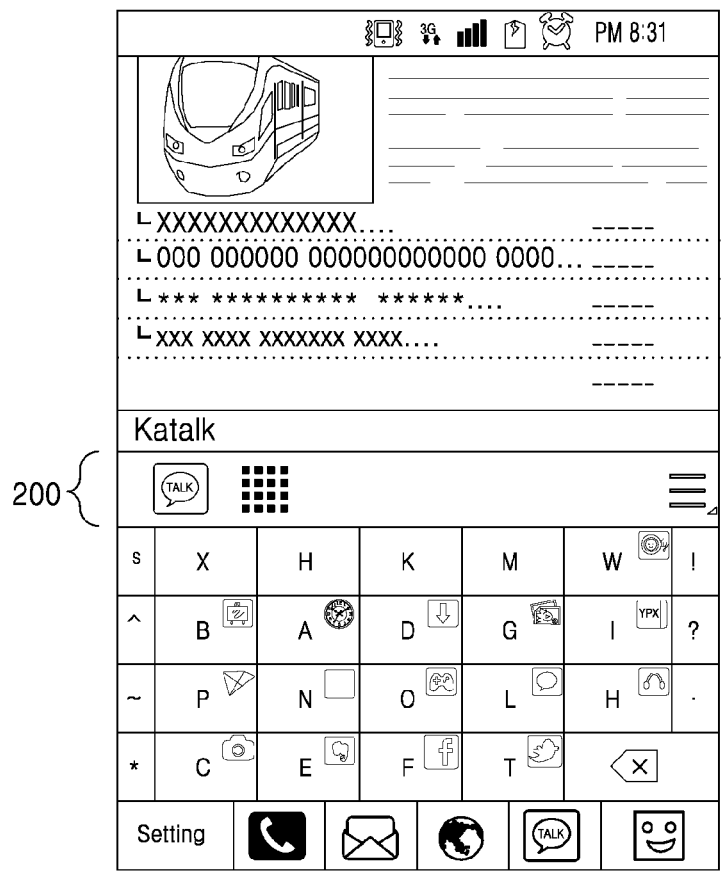
FIG. 8 illustrates a screen including a screen of a web browser application and a list of applications searched by using another received search word.

FIG. 8 illustrates a screen including a screen of a web browser application and a list 200 of applications searched by using received another search word. Referring to FIG. 8, the input interface 110 may receive "katalk" as a search word from the user. The controller 140 may search for an application including "katalk" in a tag of the application from among the applications stored in the storage 120. As illustrated in FIG. 8, the application having "kakao talk" as its name may be searched. The output interface 130 may display the output screen including the list 200 of the applications.

Referring back to FIG. 2, next, an operation (S150) of receiving a second gesture may be performed. The input interface 110 may receive a gesture from the user. For example, the gesture may include a tap, a double-tap, a multi-point tap, holding, release holding, drag, or the like.

Next, an operation (S160) of executing at least one application from among the searched applications, according to the received second gesture, may be performed. For example, referring to FIG. 6, the input interface 110 may receive, as the second gesture from the user, a tap with respect to an icon of the application having "Naver map" as its name. According to the received second gesture, the controller 140 may execute the application having "Naver map" as its name.

In addition, the controller 140 may generate a fourth output screen including a screen of the executed application. For example, the controller 140 may generate, as the fourth output screen, an output screen including a screen of the application having "Naver map" as its name. The output interface 130 may display the generated fourth output screen.

Figure 9:
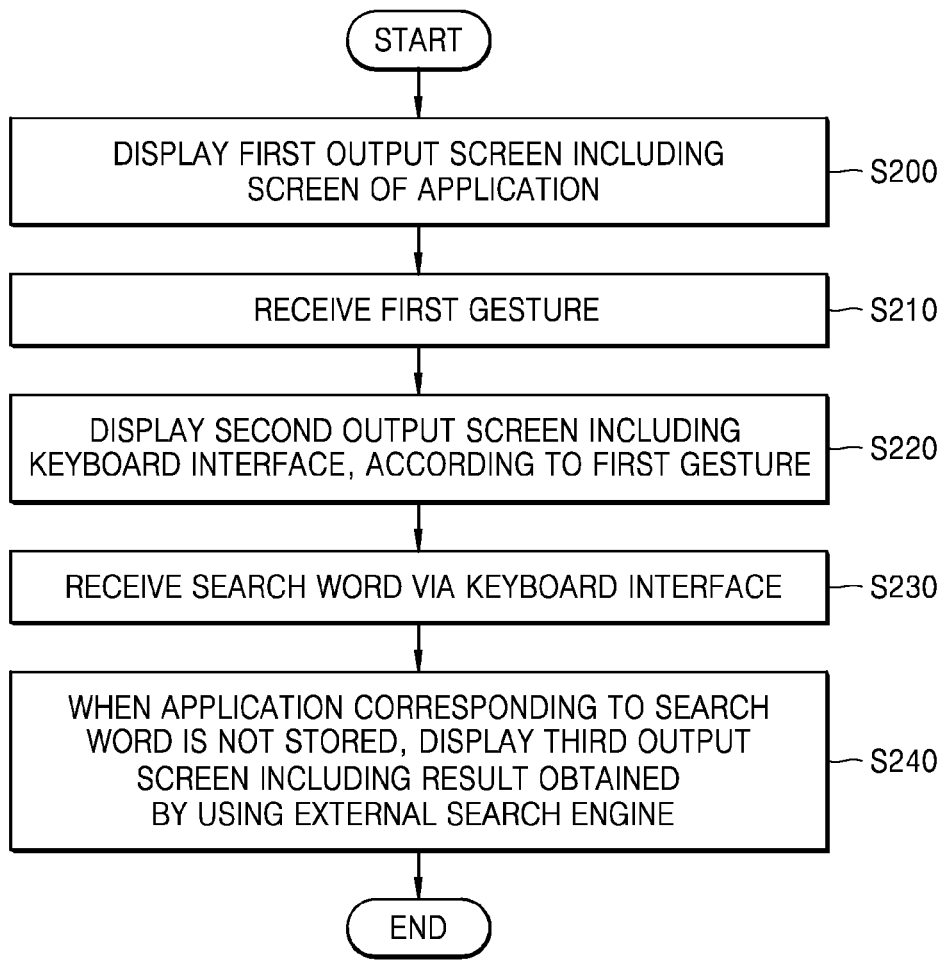
FIG. 9 is a flowchart illustrating processes of a method of controlling the terminal, according to another embodiment.

FIG. 9 is a flowchart illustrating processes of a method of controlling the terminal 100, according to another embodiment. Referring to FIG. 9, first, an operation (S200) of displaying a first output screen including a screen of an application may be performed. The operation (S200) of displaying the first output screen may correspond to the aforementioned operation (S100) of displaying the first output screen, thus, detailed descriptions thereof are omitted here.

Next, an operation (S210) of receiving a first gesture may be performed. The operation (S210) of receiving the first gesture may correspond to the aforementioned operation (S110) of receiving the first gesture, thus, detailed descriptions thereof are omitted here.

Next, an operation (S220) of displaying a second output screen including the keyboard interface 170, according to the received first gesture, may be performed. The operation (S220) of displaying the second output screen may correspond to the aforementioned operation (S120) of displaying the second output screen, thus, detailed descriptions thereof are omitted here.

Next, an operation (S230) of receiving a search word may be performed. The operation (S230) of receiving the search word may correspond to the aforementioned operation (S130) of receiving the search word, thus, detailed descriptions thereof are omitted here.

Next, when an application that corresponds to the received search word is not stored, an operation (S240) of displaying a third output screen including a search result with respect to the search word obtained by using an external search engine may be performed. The controller 140 may search for the application corresponding to the search word from among applications stored in the storage 120. If the application corresponding to the search word is not stored in the storage 120, the controller 140 may receive the search result with respect to the search word from the external search engine.

For example, the controller 140 may receive the search result with respect to the search word from a search engine of an external application sale site. The controller 140 may generate a third output screen including the received result. The output interface 130 may display the generated third output screen.

Figure 10:
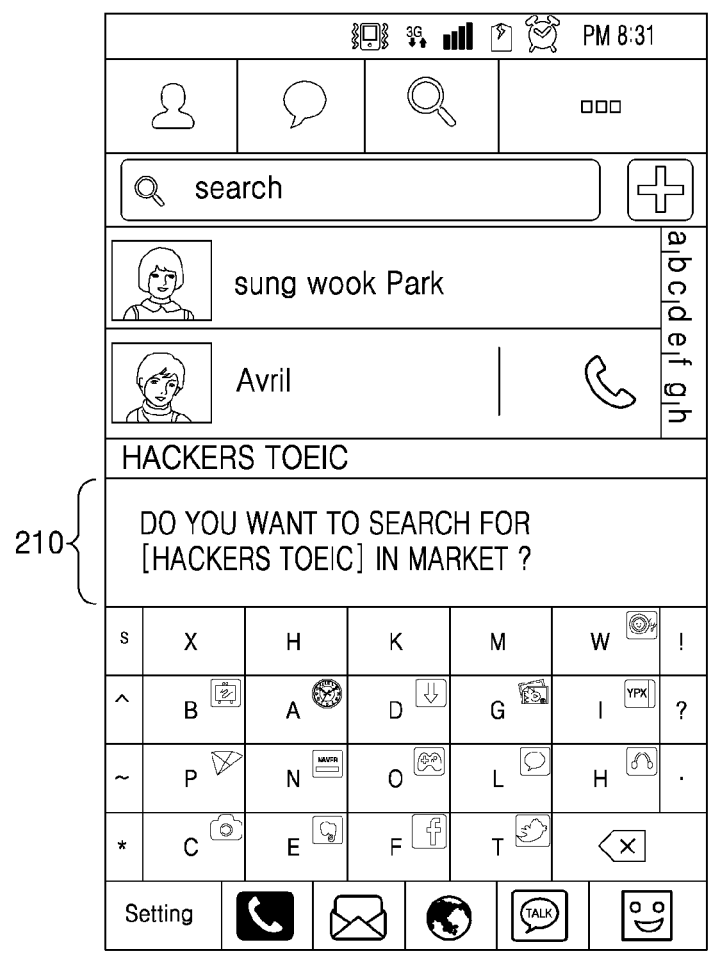
FIG. 10 illustrates a screen including a screen of a contact application and a guide sentence for checking whether or not to perform searching with respect to a search word by using an external search engine.

When the application corresponding to the received search word is not stored, before the search result with respect to the search word is received from the external search engine, the controller 140 may generate an output screen including a guide sentence for checking whether or not to perform searching with respect to the search word by using the external search engine. The output interface 130 may display the generated output screen. FIG. 10 illustrates a screen including a screen of a contact application and a guide sentence 210 for checking whether or not to perform searching with respect to a search word by using an external search engine.

Figure 11:
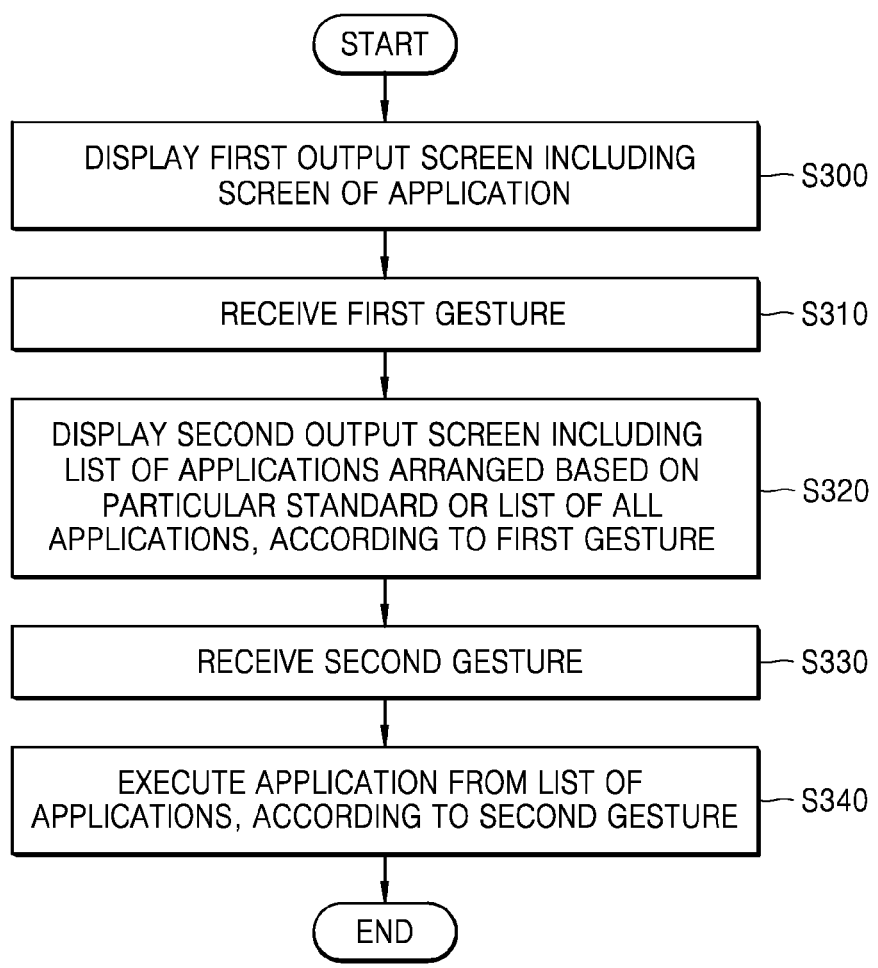
FIG. 11 is a flowchart illustrating processes of a method of controlling the terminal, according to another embodiment.

FIG. 11 is a flowchart illustrating processes of a method of controlling the terminal 100, according to another embodiment. Referring to FIG. 11, first, an operation (S300) of displaying a first output screen including a screen of an application may be performed. The operation (S300) of displaying the first output screen may correspond to the aforementioned operation (S100) of displaying the first output screen, thus, detailed descriptions thereof are omitted here.

Next, an operation (S310) of receiving a first gesture may be performed. The operation (S310) of receiving the first gesture may correspond to the aforementioned operation (S110) of receiving the first gesture, thus, detailed descriptions thereof are omitted here.

Next, an operation (S320) of displaying a second output screen including at least one of a list of applications arranged based on execution time periods, a list of applications arranged based on the number of execution times, and a list of all stored applications, according to the received first gesture, may be performed.

For example, when upward drag starting from the docked launcher icon 150 is received, the controller 140 may generate the second output screen. According to another embodiment, when a tap with respect to the floating launcher icon 160 is received, the controller 140 may generate the second output screen. The output interface 130 may display the generated second output screen.

For example, referring to FIG. 5, the second output screen may include the screen of the SMS application, a list 220 of applications arranged based on execution time periods, and a list 230 of applications arranged based on the number of execution times. Referring to the list 220 of applications illustrated in FIG. 5, an application corresponding to "Naver webtoon" may be recently executed. In addition, except for the application corresponding to "Naver webtoon", an application corresponding to "Internet" may be recently executed.

Referring to the list 230 of applications arranged based on the number of execution times illustrated in FIG. 5, an application corresponding to "phone" may have been most frequently executed. In addition, except for the application corresponding to "phone", an application corresponding to "mail" may have been most frequently executed.

Figure 12:
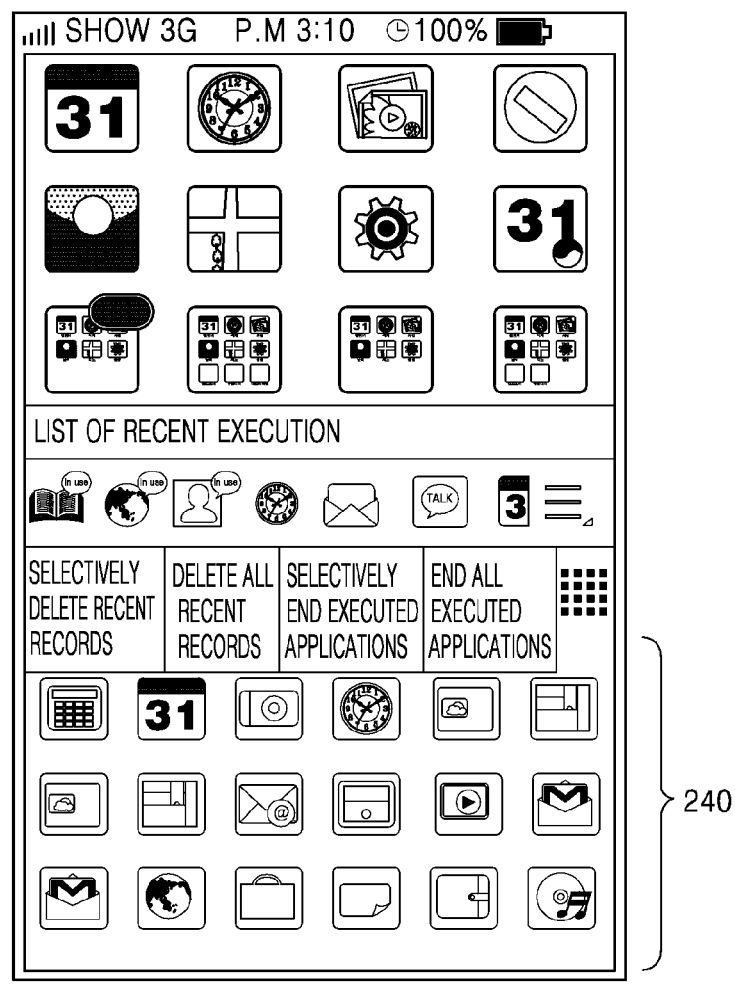
FIG. 12 illustrates a screen including a home screen and a list of all applications.

FIG. 12 illustrates a screen including a home screen and a list of all applications. Referring to FIG. 12, a second output screen may include the home screen. Also, the second output screen may include a list 240 of all applications stored in the storage 120.

Referring back to FIG. 11, next, an operation (S330) of receiving a second gesture may be performed. The input interface 110 may receive a gesture from the user. For example, the gesture may include a tap, a double-tap, a multi-point tap, holding, release holding, drag, or the like.

Next, an operation (S340) of executing at least one application from among the displayed applications may be performed, according to the received second gesture. For example, referring to FIG. 12, the input interface 110 may receive, as the second gesture from the user, a tap with respect to an icon of an application having "help" as its name. According to the received second gesture, the controller 140 may execute the application having "help" as its name.

In addition, the controller 140 may generate a third output screen including a screen of the executed application. For example, the controller 140 may generate, as the third output screen, an output screen including a screen of the application having "help" as its name. The output interface 130 may display the generated third output screen.

Figure 13:
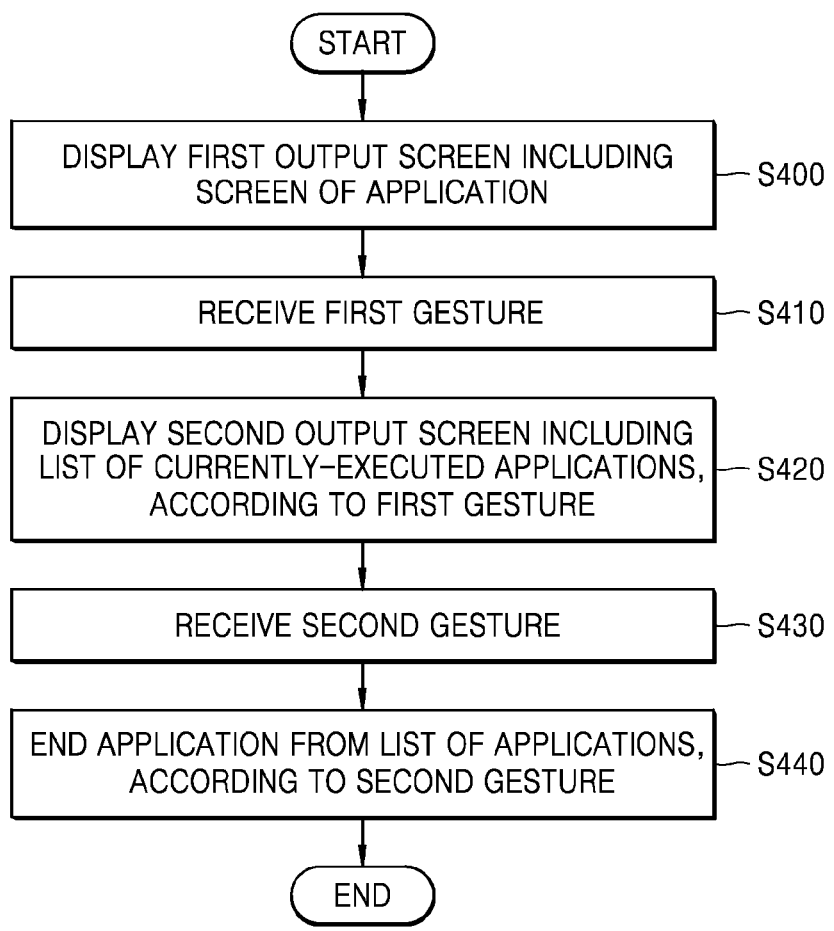
FIG. 13 is a flowchart illustrating processes of a method of controlling the terminal, according to another embodiment.

FIG. 13 is a flowchart illustrating processes of a method of controlling the terminal 100, according to another embodiment. Referring to FIG. 13, first, an operation (S400) of displaying a first output screen including a screen of an application may be performed. The operation (S400) of displaying the first output screen may correspond to the aforementioned operation (S100) of displaying the first output screen, thus, detailed descriptions thereof are omitted here.

Next, an operation (S410) of receiving a first gesture may be performed. The operation (S410) of receiving the first gesture may correspond to the aforementioned operation (S110) of receiving the first gesture, thus, detailed descriptions thereof are omitted here.

Next, an operation (S420) of displaying a second output screen including a list of currently-executed applications, according to the received first gesture, may be performed. For example, when a tap with respect to a particular icon is received after upward drag starting from the docked launcher icon 150 is received, the controller 140 may generate the second output screen. According to another embodiment, when a tap with respect to a particular icon is received after a tap with respect to the floating launcher icon 160 is received, the controller 140 may generate the second output screen. The output interface 130 may display the generated second output screen.

Figure 14:
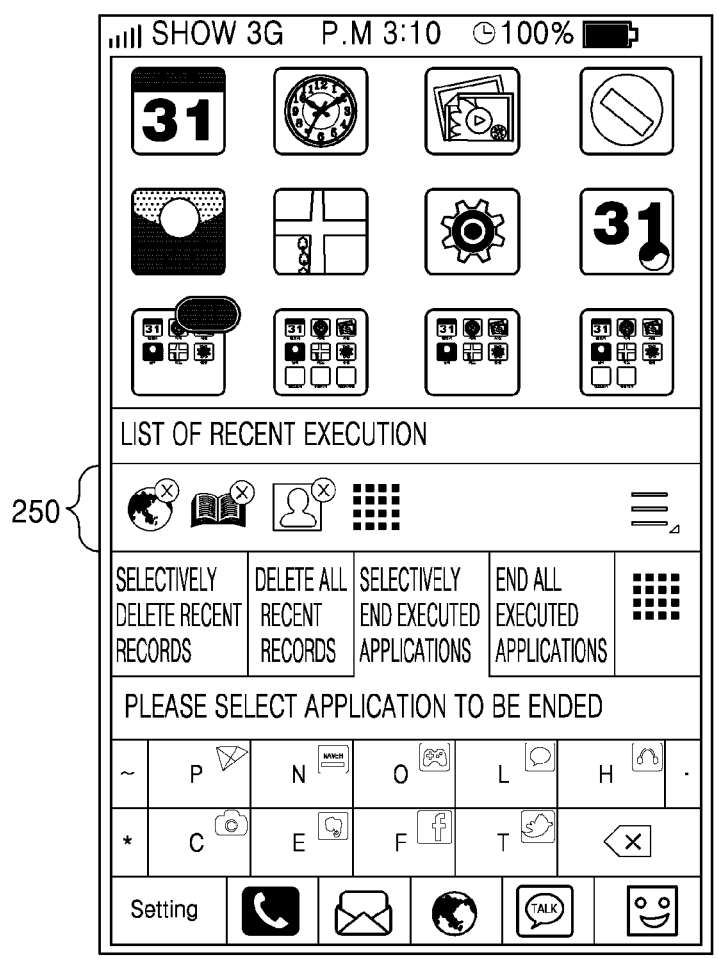
FIG. 14 illustrates a screen including a home screen and a list of applications that are currently being executed by the terminal.

The second output screen may include a list of applications that are currently being executed by the terminal 100. The second output screen may include a list of applications that are currently being executed in a foreground or background of the terminal 100. FIG. 14 illustrates a screen including a home screen and a list 250 of applications that are currently being executed by the terminal 100.

Referring back to FIG. 13, next, an operation (S430) of receiving a second gesture may be performed. The input interface 110 may receive a gesture from the user. For example, the gesture may include a tap, a double-tap, a multi-point tap, holding, release holding, drag, or the like.

Next, an operation 5440 of ending at least one application from among the displayed applications, according to the received second gesture, may be performed. For example, referring to FIG. 14, the input interface 110 may receive, as the second gesture from the user, a tap with respect to a marker "X" displayed on an upper right corner of an icon corresponding to "Naver webtoon". According to the received second gesture, the controller 140 may end an application having "Naver webtoon" as its name.

Figure 15:
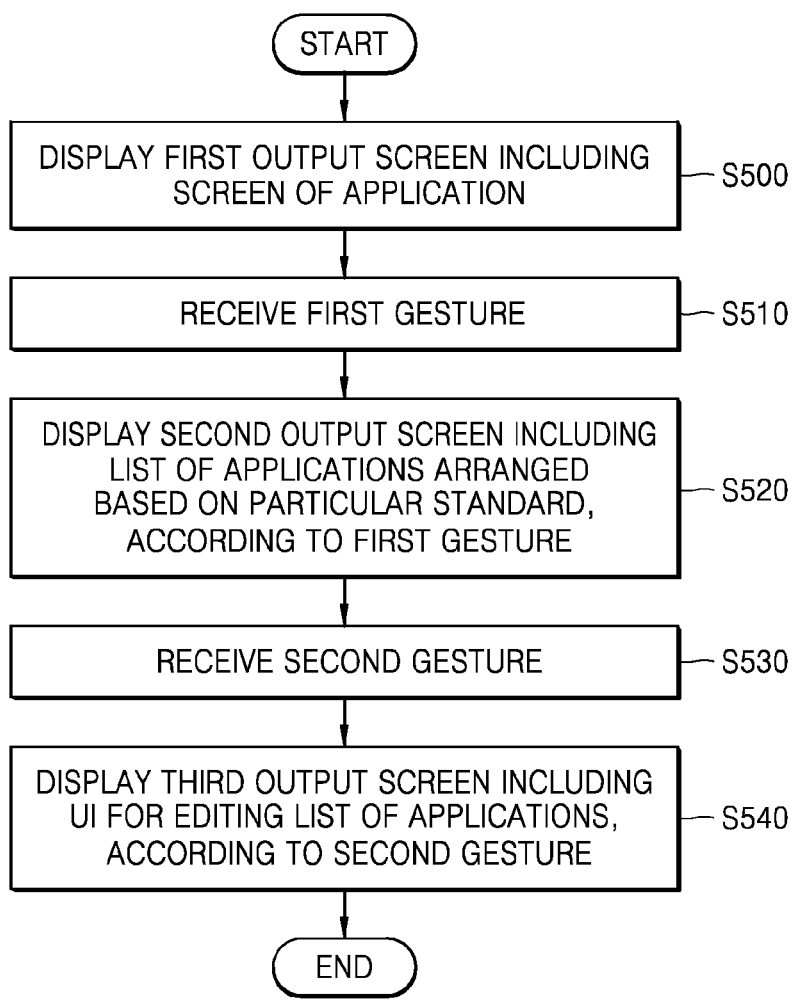
FIG. 15 is a flowchart illustrating processes of a method of controlling the terminal, according to another embodiment.

FIG. 15 is a flowchart illustrating processes of a method of controlling the terminal 100, according to another embodiment. Referring to FIG. 15, first, an operation (S500) of displaying a first output screen including a screen of an application may be performed. The operation (S500) of displaying the first output screen may correspond to the aforementioned operation (S100) of displaying the first output screen, thus, detailed descriptions thereof are omitted here.

Next, an operation (S510) of receiving a first gesture may be performed. The operation (S510) of receiving the first gesture may correspond to the aforementioned operation (S110) of receiving the first gesture, thus, detailed descriptions thereof are omitted here.

Next, an operation (S520) of displaying a second output screen including at least one of a list of applications arranged based on execution time periods and a list of applications arranged based on the number of execution times, according to the received first gesture, may be performed.

For example, when upward drag starting from the docked launcher icon 150 is received, the controller 140 may generate the second output screen. According to another embodiment, when a tap with respect to the floating launcher icon 160 is received, the controller 140 may generate the second output screen. The output interface 130 may display the generated second output screen. For example, referring to FIG. 5, the second output screen may include the screen of the SMS application, the list 220 of applications arranged based on execution time periods, and the list 230 of applications arranged based on the number of execution times.

Referring back to FIG. 15, next, an operation (S530) of receiving a second gesture may be performed. The input interface 110 may receive a gesture from the user. For example, the gesture may include a tap, a double-tap, a multi-point tap, holding, release holding, drag, or the like.

Figure 16:
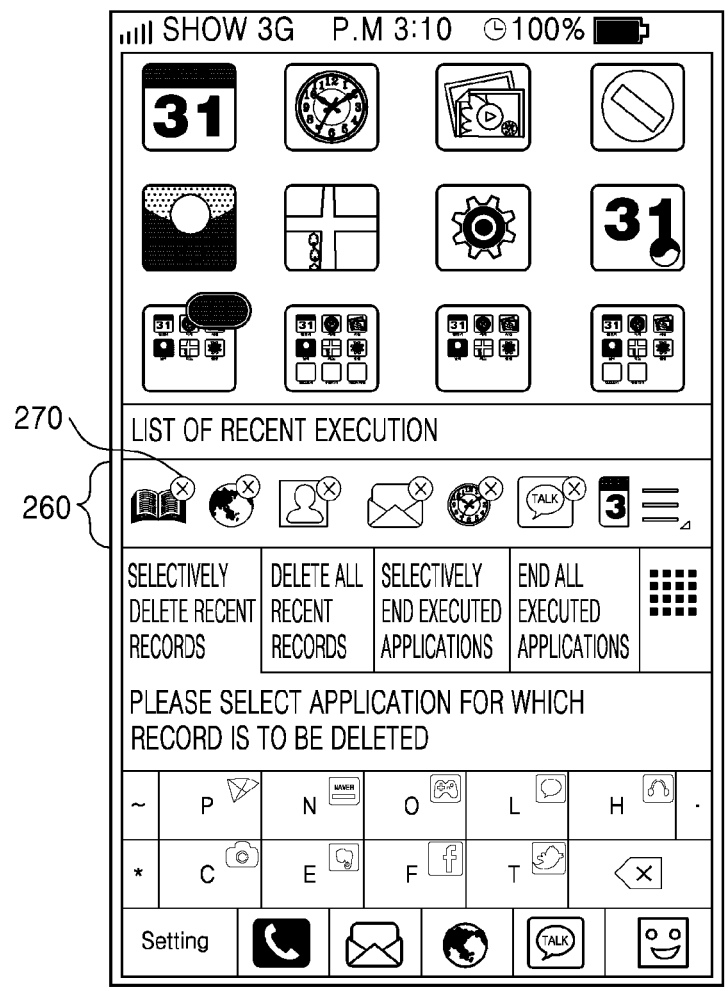
FIG. 16 illustrates a screen including a home screen and a list of applications that are recently executed by the terminal.

Next, an operation (S540) of displaying a third output screen including a user interface for editing the displayed list of the applications, according to the received second gesture, may be performed. For example, the input interface 110 may receive a tap with respect to a particular icon from the user. Referring to FIG. 16, the input interface 110 may receive, from the user, a tap with respect to an icon corresponding to "selectively delete recent records".

The third output screen may include a marker "X" 270 disposed at each of upper right corners of icons respectively corresponding to applications, the marker "X" 270 being as a user interface for editing the displayed list of the applications. Referring to FIG. 16, the third output screen may include the markers "X" 270 disposed at upper right corners of icons respectively corresponding to applications included in a list 260 of the applications arranged based on execution time periods. The marker "X" 270 may be a user interface for excluding a particular application from the displayed list of the applications.

According to another embodiment, the third output screen may include a user interface for switching a particular application in the displayed list of the applications to another application. According to another embodiment, the third output screen may include a user interface for adding a particular application to the displayed list of the applications. According to another embodiment, the third output screen may include a user interface for changing an order of the applications included in the displayed list of the applications.

Figure 17:
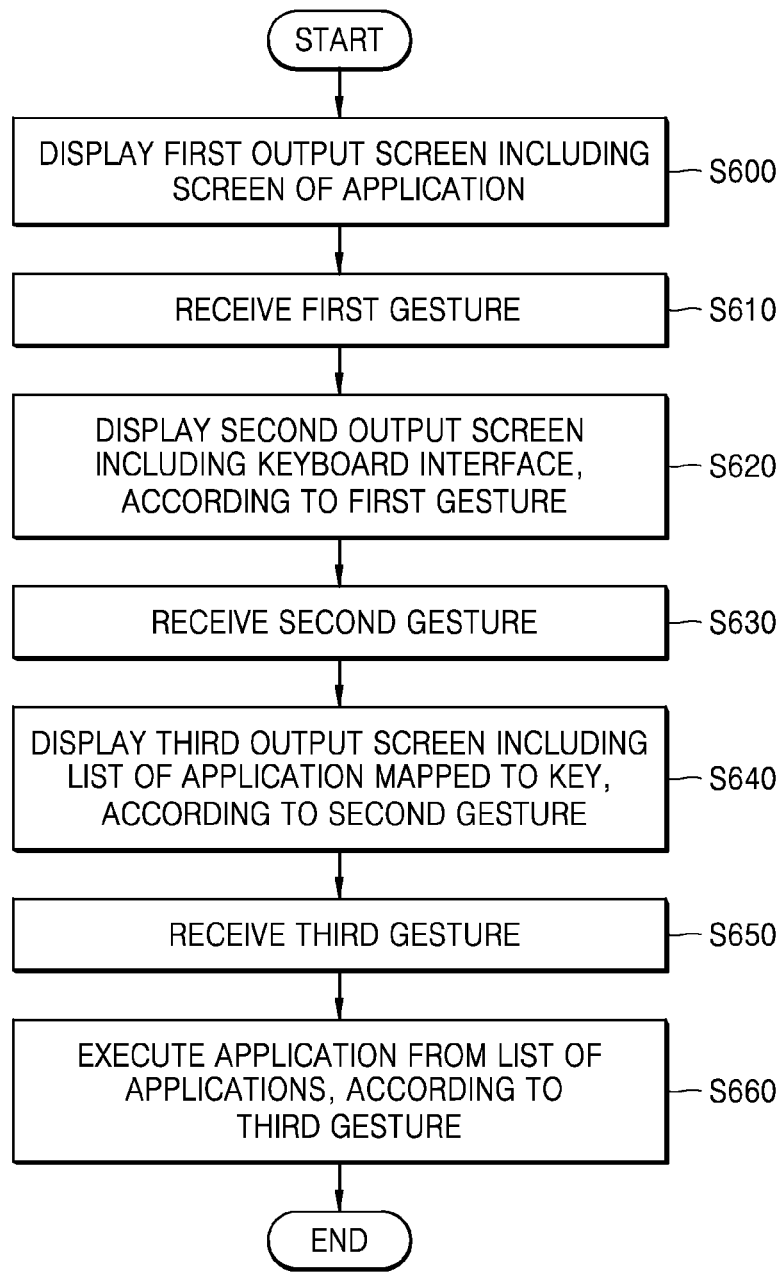
FIG. 17 is a flowchart illustrating processes of a method of controlling the terminal, according to another embodiment.

FIG. 17 is a flowchart illustrating processes of a method of controlling the terminal 100, according to another embodiment. Referring to FIG. 17, first, an operation (S600) of displaying a first output screen including a screen of an application may be performed. The operation (S600) of displaying the first output screen may correspond to the aforementioned operation (S100) of displaying the first output screen, thus, detailed descriptions thereof are omitted here.

Next, an operation (S610) of receiving a first gesture may be performed. The operation (S610) of receiving the first gesture may correspond to the aforementioned operation (S110) of receiving the first gesture, thus, detailed descriptions thereof are omitted here.

Next, an operation (620) of displaying a second output screen including the keyboard interface 170, according to the received first gesture, may be performed. The operation (S620) of displaying the second output screen may correspond to the aforementioned operation (S120) of displaying the second output screen, thus, detailed descriptions thereof are omitted here.

Next, an operation (S630) of receiving a second gesture may be performed. The input interface 110 may receive a gesture from the user. For example, the gesture may include a tap, a double-tap, a multi-point tap, holding, release holding, drag, or the like.

Next, an operation (S640) of displaying a third output screen including a list of an application mapped to a key of the keyboard interface 170, according to the received second gesture, may be performed. The keyboard interface 170 may include one or more keys. A list of an application may be previously mapped to at least one key from among the keys.

For example, the keys included in the keyboard interface 170 may be previously mapped to lists of applications from among all applications stored in the storage 120, wherein first syllables of names of the applications respectively correspond to values of the keys. The input interface 110 may receive, as the second gesture, holding with respect to one key from among the keys included in the keyboard interface 170. The controller 140 may generate the third output screen including a list of applications mapped to the one key. The output interface 130 may display the generated third output screen.

Figure 18:
FIG. 18 illustrates a screen including a screen of a contact application and a list of applications mapped to a key of the keyboard interface.

FIG. 18 illustrates a screen including a screen of a contact application and a list of applications mapped to a key of the keyboard interface 170. Referring to FIG. 18, an application list may be previously mapped to a key value "L". The application list may include three applications having "Readers Hub", "Line", and "Lotte cinema" as their names.

Figure 19:
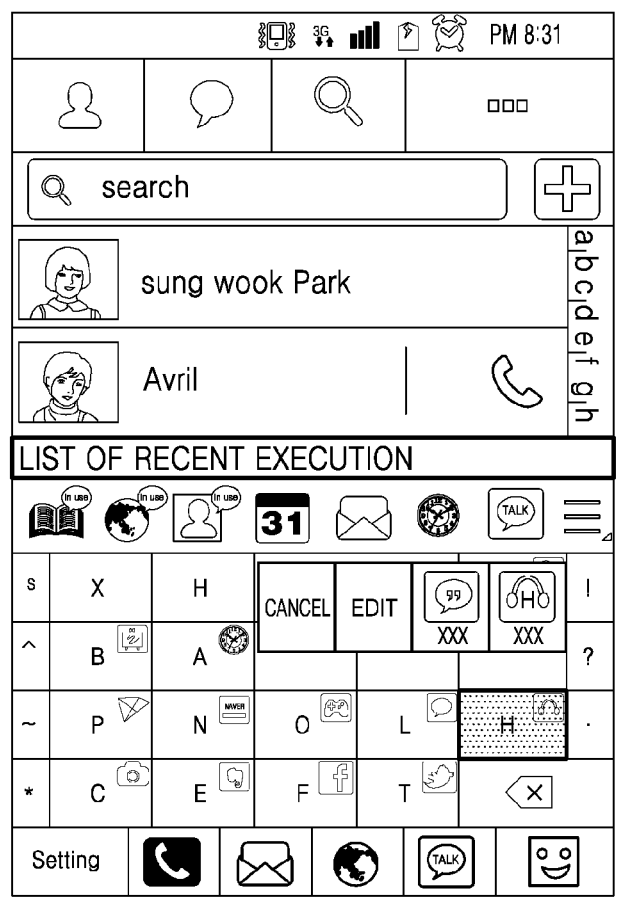
FIG. 19 illustrates a screen including a screen of a contact application and a list of applications mapped to another key of the keyboard interface.

FIG. 19 illustrates a screen including a screen of a contact application and a list of applications mapped to another key of the keyboard interface 170. Referring to FIG. 19, an application list may be previously mapped to a key value "H". The application list may include two applications having "Hangouts" and "Hackers MP3" as their names.

Referring back to FIG. 17, next, an operation (S650) of receiving a third gesture may be performed. The input interface 110 may receive a gesture from the user. For example, the gesture may include a tap, a double-tap, a multi-point tap, holding, release holding, drag, or the like.

Next, an operation (S660) of executing at least one application from among the displayed applications, according to the received third gesture, may be performed. For example, referring to FIG. 18, the input interface 110 may receive release holding as the third gesture from the user. The controller 140 may execute an application from a list of applications according to the received third gesture, the application corresponding to a currently rolled-over icon.

An icon corresponding to a particular application from a list of applications mapped to English keys (or consonant keys) based on positions of the English keys (or the consonant keys) of the keyboard interface 170 may be rolled over as a default. Therefore, when release holding is received as the third gesture, the controller 140 may execute the particular application.

For example, referring to FIG. 18, an icon corresponding to "Line" may be rolled over as a default. Therefore, when release holding is received as the third gesture, the controller 140 may execute the application corresponding to "Line". In addition, referring to FIG. 19, an icon corresponding to "Hackers MP3" may be rolled over as a default. Therefore, when release holding is received as the third gesture, the controller 140 may execute the application corresponding to "Hackers MP3".

The input interface 110 may receive drag in a left direction as the third gesture from the user. The controller 140 may control an icon in a left side of the currently rolled-over icon to be rolled over. Therefore, when drag in the left direction and then release holding are received as the third gesture, the controller 140 may execute an application corresponding to the icon in the left side of the currently rolled-over icon. Referring to FIG. 18, when drag in the left direction and then release holding are received as the third gesture, the controller 140 may execute the application corresponding to "Readers Hub".

The input interface 110 may receive drag in a right direction as the third gesture from the user. The controller 140 may control an icon in a right side of the currently rolled-over icon to be rolled over. Therefore, when drag in the right direction and then release holding are received as the third gesture, the controller 140 may execute an application corresponding to the icon in the right side of the currently rolled-over icon. Referring to FIG. 18, when drag in the right direction and then release holding are received as the third gesture, the controller 140 may execute the application corresponding to "Lotte cinema".

In addition, the controller 140 may generate a fourth output screen including a screen of the executed application. For example, referring to FIG. 18, when release holding is received as the third gesture, the controller 140 may generate, as the fourth output screen, an output screen including a screen of the application having "Line" as its name. The output interface 130 may display the generated fourth output screen.

Figure 20:
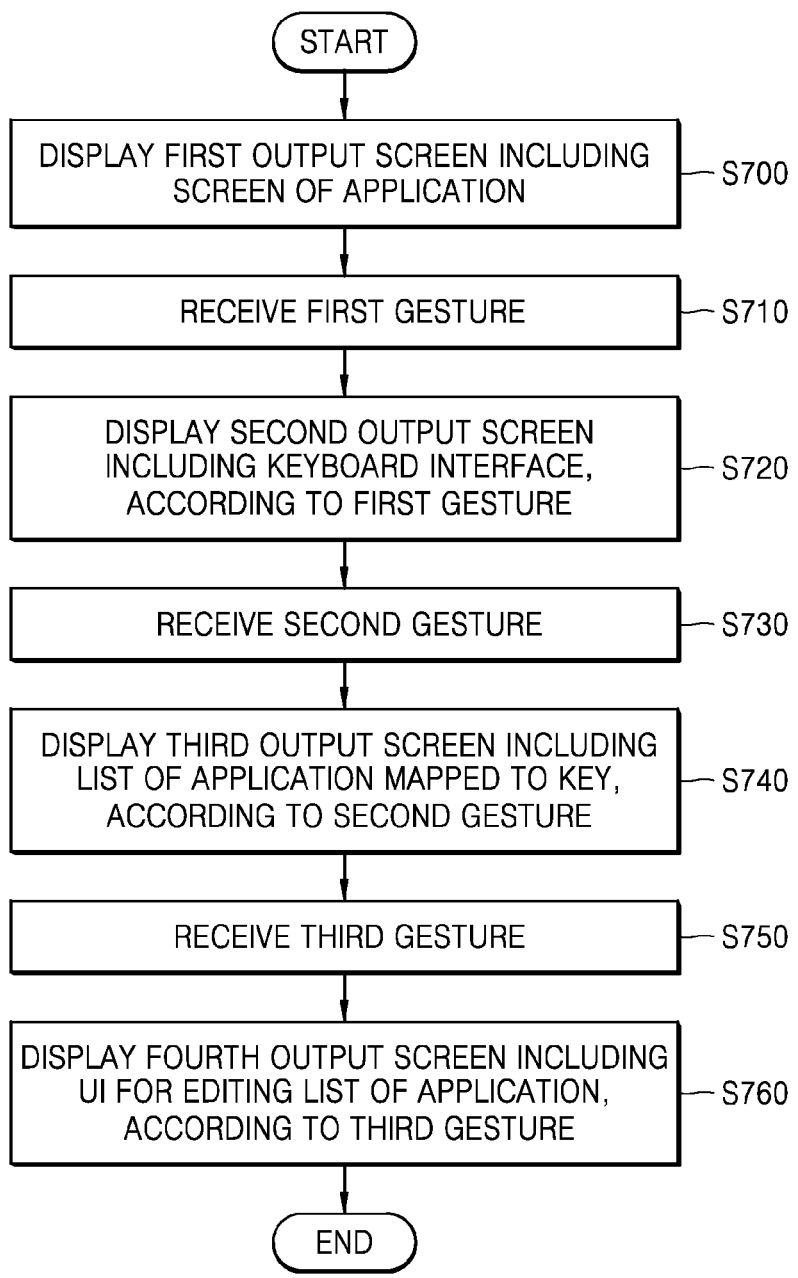
FIG. 20 is a flowchart illustrating processes of a method of controlling the terminal, according to another embodiment.

FIG. 20 is a flowchart illustrating processes of a method of controlling the terminal 100, according to another embodiment. Referring to FIG. 20, first, an operation (S700) of displaying a first output screen including a screen of an application may be performed. The operation (S700) of displaying the first output screen may correspond to the aforementioned operation (S100) of displaying the first output screen, thus, detailed descriptions thereof are omitted here.

Next, an operation (S710) of receiving a first gesture may be performed. The operation (S710) of receiving the first gesture may correspond to the aforementioned operation (S110) of receiving the first gesture, thus, detailed descriptions thereof are omitted here.

Next, an operation (720) of displaying a second output screen including the keyboard interface 170, according to the received first gesture, may be performed. The operation (S720) of displaying the second output screen may correspond to the aforementioned operation (S120) of displaying the second output screen, thus, detailed descriptions thereof are omitted here.

Next, an operation (S730) of receiving a second gesture may be performed. The input interface 110 may receive a gesture from the user. For example, the gesture may include a tap, a double-tap, a multi-point tap, holding, release holding, drag, or the like.

Next, an operation (S740) of displaying a third output screen including a list of an application mapped to a key of the keyboard interface 170, according to the received second gesture, may be performed. The operation (S740) of displaying the third output screen may correspond to the aforementioned operation (S640) of displaying the third output screen, thus, detailed descriptions thereof are omitted here.

Next, an operation (S750) of receiving a third gesture may be performed. The input interface 110 may receive a gesture from the user. For example, the gesture may include a tap, a double-tap, a multi-point tap, holding, release holding, drag, or the like.

Next, an operation (S760) of displaying a fourth output screen including a user interface for editing the list of the mapped application, according to the received third gesture, may be performed. Referring to FIG. 18, the input interface 110 may receive drag in the left direction and then release holding, as the third gesture. The controller 140 may control an icon corresponding to "Edit" to be rolled over, in response to the drag in the left direction.

In addition, the controller 140 may generate the fourth output screen including the user interface for editing the list of the mapped application, in response to release holding. The output interface 130 may display the generated fourth output screen.

Figure 21:
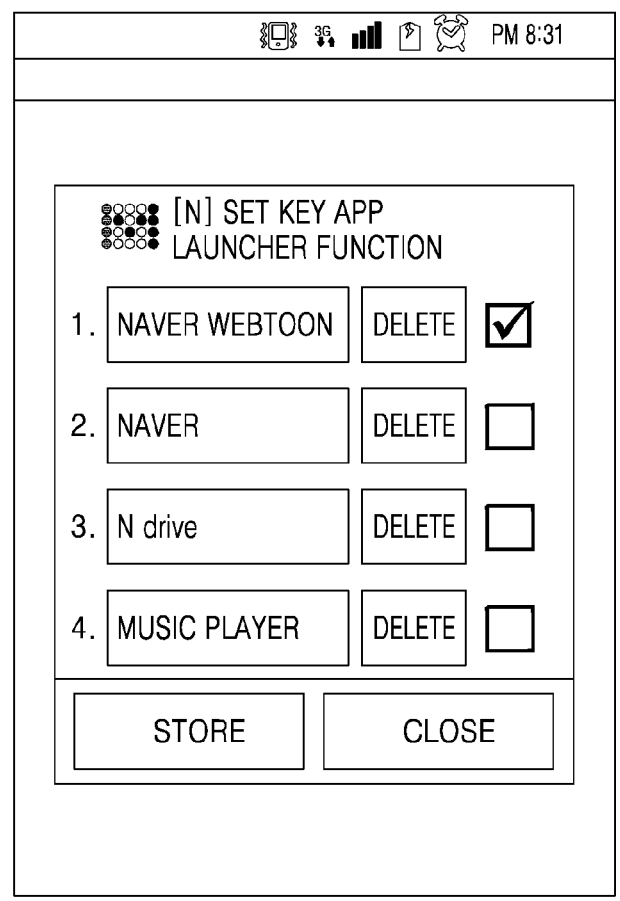
FIG. 21 illustrates a screen including a user interface for allowing a user to edit a list of applications mapped to a key of the keyboard interface.

FIG. 21 illustrates an output screen including a user interface for allowing the user to edit a list of applications mapped to a key of the keyboard interface 170. Referring to FIG. 21, a fourth output screen may include buttons respectively disposed in right sides of applications, the buttons being as user interfaces for editing the list of the mapped applications. Each of the buttons may be the user interface for excluding a particular application from the list of the mapped applications.

According to another embodiment, the fourth output screen may include a user interface for switching a particular application in the list of the mapped applications to another application. According to another embodiment, the fourth output screen may include a user interface for adding a particular application to the list of the mapped applications.

According to another embodiment, the fourth output screen may include a user interface for changing an order of the applications included in the list of the mapped applications. According to another embodiment, the fourth output screen may include a user interface for designating an application from among the applications included in the list of the mapped applications, the application corresponding to an icon to be rolled over as a default.

The keyboard interface 170 may always be executed as a daemon in an operating system of the terminal 100. Therefore, according to the described embodiments, the user of the terminal 100 may easily switch a screen displayed on the terminal 100 from a screen of one application to a screen of another application, and a calculation load and a memory managing load of the terminal 100 during the switch may also be decreased. In addition, according to the described embodiments, the user of the terminal may easily search for and execute an application.

While the present disclosure has been particularly shown and described with reference to exemplary embodiments thereof and drawings, it will be understood by one of ordinary skill in the art that various changes in form and details may be made therein without departing from the spirit and scope of the following claims. Therefore, the embodiments should be considered in descriptive sense only and not for purposes of limitation.

What is claimed:
1. A method of controlling an electronic device, the method comprising:
  displaying a first output screen comprising a screen of an application and a launcher icon docked on the first output screen;
  receiving a first gesture comprising a drag starting from the launcher icon; displaying a second output screen comprising a keyboard interface, according to the received first gesture;
  receiving a search word via the keyboard interface;
  displaying a third output screen comprising a first list of applications searched by using the received search word, wherein the third output screen is displayed adjacent to the keyboard interface at an upper end of the keyboard interface;
  receiving a second gesture on one key from among keys included in the keyboard interface, wherein the second gesture comprises long holding the one key;
  displaying a fourth output screen on an area where the keyboard interface is displayed, according to the received second gesture, wherein the fourth output screen is displayed as an overlay on the keyboard interface, and wherein the fourth output screen comprises a second list of applications mapped to the one key from among keys included in the keyboard interface and an icon for editing the second list;
  simultaneously displaying the first and second lists of applications at the electronic device;

displaying a user interface for adding one or more applications to the second list according to a user input selecting the icon for editing the second list;

receiving a third gesture selecting at least one application from among the first list of applications and the second list of applications; and executing the at least one application according to the received third gesture.

2. The method of claim 1, wherein the first output screen further comprises a floating launcher icon, and wherein receiving the first gesture further comprises receiving a tap with respect to the launcher icon.

3. The method of claim 1, wherein displaying the third output screen comprises:

searching for, from among stored applications, at least one application comprising the search word in names of the stored applications; and displaying the third output screen comprising the first list of applications comprising the searched at least one application.

4. The method of claim 1, wherein displaying the third output screen comprises:

arranging the searched applications comprised in the list, based on a number of times the applications have been executed; and displaying the third output screen comprising the first list of applications comprising the arranged applications.

5. The method of claim 1, wherein displaying the third output screen comprises:

searching for, from among stored applications, at least one application comprising the search word in an initial sound list of names of the stored applications; and displaying the third output screen comprising the first list of the applications comprising the searched at least one application.

6. The method of claim 1, wherein displaying the third output screen comprises:

searching for, from among stored applications, at least one application comprising the search word in tags corresponding to the stored applications; and displaying the third output screen comprising the first list of the applications comprising the searched at least one application.

7. The method of claim 1, wherein receiving the third gesture comprises receiving a tap with respect to a particular application from among the first list of applications and the second list of applications.

8. The method of claim 1, further comprising displaying a fifth output screen comprising an execution screen of the at least one application.

9. The method of claim 1, wherein first syllables of names of applications in the second list correspond to the one key.

10. An electronic device comprising:
a display;
a memory configured to store one or more applications; and
at least one processor configured to:

generate a first output screen comprising a screen of an application from among the one or more applications and a launcher icon docked on the first output screen, control the display to display the first output screen, receive a first gesture comprising a drag gesture with respect to the launcher icon, generate a second output screen comprising a keyboard interface according to the received first gesture, control the display to display the second output screen, receive a search word via the keyboard interface, generate a third output screen comprising a first list of at least one application corresponding to the received search word from among the one or more applications stored in the memory, wherein the third output screen is displayed adjacent to the keyboard interface at an upper end of the keyboard interface, control the display to display the third output screen, receive a second gesture on one key from among keys included in the keyboard interface, wherein the second gesture comprises long holding the one key, control the display to display a fourth output screen on an area where the keyboard interface is displayed, according to the received second gesture, wherein the fourth output screen is displayed as an overlay on the keyboard interface, and wherein the fourth output screen comprises a second list of applications mapped to the one key from among keys included in the keyboard interface and an icon for editing the second list, control the display to simultaneously display the first and second lists of applications, control the display to display a user interface for adding one or more applications to the second list according to a user input selecting the icon for editing the second list, receive a third gesture selecting at least one application from among the first list of applications and the second list of applications, and execute the at least one application, according to the received third gesture.

11. The electronic device of claim 10, wherein the first output screen comprises a floating launcher icon, and wherein the first gesture further comprises a tap with respect to the launcher icon.

12. The electronic device of claim 10, wherein the at least one processor is further configured to:

generate a fifth output screen comprising an execution screen of the at least one application, and control the display to display the fifth output screen.

13. A non-transitory computer-readable recording medium having recorded thereon a program for executing the method of claim 1.

14. The electronic device of claim 10, wherein first syllables of names of the applications in the second list correspond to the one key.

* * * * *